United States Patent

Hüpfl et al.

[11] 4,063,883
[45] Dec. 20, 1977

[54] MANUFACTURE OF FLAME-RETARDANT REGENERATED CELLULOSE FIBRES

[75] Inventors: Johann Hüpfl, Seewalchen; Manfred Czermak, Timelkam; Helmut Teichmann; Josef Paul, both of Vocklabruck, all of Austria

[73] Assignees: Hoechst Aktiengesellschaft, Frankfurt am Main, Germany; Chemiefaser Lenzing Aktiengesellschaft, Lenzing, Austria

[21] Appl. No.: 604,489

[22] Filed: Aug. 14, 1975

[30] Foreign Application Priority Data

Aug. 20, 1974 Austria ..................... 6759/4

[51] Int. Cl.² ................................ D01F 2/08
[52] U.S. Cl. ............................. 8/116 P; 106/15 FP; 260/13; 260/17 A; 260/17.4 GC; 264/194; 264/198; 423/302
[58] Field of Search ............... 264/188, 194, 198, 211; 106/15 FP; 423/302; 260/13, 17 A, 17.4 GC, 45.9 NP; 8/116 P

[56] References Cited

U.S. PATENT DOCUMENTS

| | | | |
|---|---|---|---|
| 2,582,181 | 1/1952 | Truhlar et al. | 106/15 FP |
| 2,816,004 | 12/1957 | Rossin et al. | 264/188 |
| 3,034,919 | 5/1962 | Steinhauer | 106/15 FP |
| 3,266,918 | 8/1966 | Schappel et al. | 106/165 |
| 3,455,713 | 7/1969 | Godfrey | 106/165 |
| 3,783,016 | 1/1974 | Randall et al. | 264/211 |
| 3,925,274 | 12/1975 | Brickman et al. | 260/17.4 GC |
| 3,947,276 | 3/1976 | Siclari et al. | 106/15 FP |
| 3,974,251 | 8/1976 | Cremer et al. | 264/194 |

FOREIGN PATENT DOCUMENTS

736,508   6/1966   Canada.

OTHER PUBLICATIONS

"Nitrogen-Phosphorus Synergism in Flame-Retardant Cellulose", Tesoro et al., Textile Research Journal, 2-1969, pp. 180-190.
"A New Chemical Approach to Durable Flame-Retardant Cotton Fabrics", Aenishänslin et al., Textile Research Journal, 4-1969, pp. 375-381.

*Primary Examiner*—Jeffery R. Thurlow
*Attorney, Agent, or Firm*—Connolly and Hutz

[57] ABSTRACT

Manufacture of flame-retardant regenerated cellulose fibres by adding one or more flame-retardant phosphorus comounds to viscose, extruding the viscose-containing mixture thus obtained into a spinning bath, stretching and after treating the resulting filaments or staple fibres. The flame-retardant fibres are made by using as the flame-retardant agent a combination of compounds of the general formula:

$$PN_xO_y$$

in which $x$ stands for a number between 0.09 and 1.7 and $y$ stands for a number between 1.2 and 0, preferably approaching zero as the values of $x$ increase towards 1.7 (component A), with compounds which are selected from phosphoric acid alkylesters, preferably halogen-containing phosphoric acid alkylesters; cyclophosphazenes, polyphosphazenes; tetrakis-(oxymethyl)-phosphonium chloride or hydroxide or its condensation products with ammonia, oxymethylamine, urea or other amines or amides, vinyl compounds containing halogen, phosphonitrogen or phosphorus; and tris-(1-aziridinyl)-phosphine oxide or N-(oxymethyl)-3-phosphonopropionamide, if desired in further combination with a condensation resin (component B).

3 Claims, No Drawings

MANUFACTURE OF FLAME-RETARDANT REGENERATED CELLULOSE FIBRES

The present invention reletes of the production of flame-retardant regenerated cellulose fibres by adding one or more flame-retardant phosphorus compounds to viscose, extruding the viscose containing mixture thus obtained into a spinning bath and, if desired, stretching and after-treating the resulting filaments or staple fibres.

Various processes for making flame-retardant regenerated cellulose fibres have already been described, wherein various flame-retardant agents are added to the viscose, prior to extruding it. Halogen-containing phosphoric acid esters, e.g. tris-(2,3-dibromopropyl)phosphate, have more particularly been used as the flame-retardant agents (cf. U.S. Pat. No. 3,266,918, British Pat. No. 1,158,231 and French Pat. Nos. 1,495,909 and 1,599,000). These halogen-containing phosphoric acid esters are, however, not entirely suitable for use in the viscose spinning process, in view of their chemical reactivity with the other constituents of the viscose containing mixture, and in view of the fact that they are used in the liquid state. More particularly, the above-mentioned compounds are hydrolyzable in alkaline media, in which they undergo partial decomposition and are deprived of their flame-retardant properties. They have also been found to react with carbon disulphide, which is present in the viscose, with the resultant formation of strongly coloured by-products which impair the external appearance of the resulting fibres and which are difficult to bleach away. These compounds are generally incorporated in the fibres only fractionally, as a result of their being used in the liquid state. Considerable proportions of the flame-retardant agents or the decomposition products thereof go into the coagulating bath or after-treatment baths, which are used in viscose spinning, where they initiate a series of disadvantageous effects, such as increased corrosiveness, unpleasant smell and similar phenomena.

Further known flame-retardant agents which can be added to regenerated cellulose fibres include phosphonitrile chloride derivatives and phosphonitrilate polymers. The use of these compounds has been described, for example in U.S. Pat. No. 3,455,713 and Austrian Pat. No. 269,338, respectively. These latter compounds have an improved stability to viscose and compare favourably in this property with the halogen-containing phosphoric acid esters first referred to hereinabove. In addition to this, they have been found to affect the fibres' appearance less adversely. Despite this, they are again not fully satisfactory because considerable portions of the compounds go into the coagulating baths, where they are lost, which does not make for economy.

German published Specification ("Offenlegungsschrift") No. 1,944,056 describes a process comprising spinning red phosphorus into viscose fibres. In this case, it is possible for red phosphorus to be spun into the fibres practically quantitatively, generally without any adverse effects on the fibre production process. The resulting fibres, however, are dark violet and admit of only limited use in the textile field.

In accordance with the present invention, we now provide a process which is free from the disadvantages and difficulties referred to hereinabove and which comprises producing flame-retardant regenerated cellulose fibres with the use of one or more flame-retardant compounds which produce reliable flame-retardant effects, even in minor proportions, and are easy to apply to the fibres.

It is also highly desirable to have fibres which retain their flame-retardant property after repeated washing, which are easy to dye, and of which the appearance remains unimpaired under ultraviolet light.

These objects can be achieved in accordance with the present invention, which provides a process for making flame-retardant regenerated cellulose fibres by adding one or more flame-retardant phosphorus compounds to viscose, extruding the viscose containing mixture thus obtained into a spinning bath and, if desired, stretching and after-treating the resulting filaments or stable fibres, wherein the flame-retardant agent used is comprised of a combination of compounds of the general formula:

$$PN_xO_y$$

in which $x$ stands for a number between 0.9 and 1.7 and $y$ stands for a number between 1.2 and 0, preferably approaching zero as the values of $x$ increase towards 1.7 (component A), with compounds which are selected from phosphoric acid alkyl esters, preferably halogen-containing phosphoric acid alkyl esters; cyclophosphazenes, polyphosphazenes; tetrakis-(oxymethyl)-phosphonium chloride or hydroxide or its condensation products with ammonia, oxymethyl-melamine, urea or other amines or amides; vinyl compounds containing halogen, phosphonitrogen or phosphorus; and tris-(1-aziridinyl)-phosphine oxide or N-(oxymethyl)-3-phosphono-propionamide, if desired in further combination with a condensation resin (component B).

The preferred component A representatives are phosphorus nitride, triphosphorus pentanitride, tetraphosphorus hexanitride, and/or phosphorus nitride oxide. It is advisable that the compound(s) used in accordance with the present invention should be solid; thus once they are in pulverulent form, it is possible for them to be dispersed in the viscose or to be spun into the fibres, similarly to titanium dioxide or coloured pigments. The compounds are completely inert with respect to the viscose and the bath used in the viscose spinning process. In clear contrast with some dyestuffs, they could not be found to "bleed out" from the fibres. In other words, they can be incorporated into the fibres substantially quantitatively.

Preferred component B representatives include: tris-(2,3-dibromopropyl)-phosphate $(CH_2BrCHBrCH_2O)_3$.PO; tris-(2,2'-dichloroisopropyl)-thiophosphate $[(CH_2Cl)_2CHO]$; poly-(isopropoxyphosphazene) - $[N=P((CH_3)_2(CHO)_2—]_n$, in which $n$ stands for a number from 3 to 9.

The combination of the above component A compounds with the component B compounds has an unexpected result in enabling satisfactory flame-retardant effects to be produced with the use of the combined agent in low proportions within the range about 5 and 22%, based on the quantity of cellulose, i.e. in proportions considerably smaller than those needed for the separate use of the A and B components, respectively. Experiments have shown this synergism to be based on the fact that the component B compounds commence pyrolyzing activity in the cellulose at temperatures within the range about 220° and 250° C, i.e. at lower temperatures than the component A compounds (about 300° C). Such early pyrolysis causes the activity of the component A compounds, which contain considerable nitrogen and phosphorus and accordingly critically determine the flame-retardant effects, to be initiated and promoted.

Between 4 and 17% of the component A compounds and between 1 and 5% of the component B compounds, the percentages being based on the quantity of cellulose, should preferably be used in combination with one another.

While component A is always added to viscose and spun therewith, it is possible for component B to be used in various ways. With respect to the phosphoric acid alkylesters, the cyclo- and polyphosphazenes and the condensation products of tetrakis-(oxymethyl)-phosphonium chloride or hydroxide with ammonia, oxymethylamine, urea or other amines or amides, it is possible for them to be used in the form of liquids or pigments and to be added jointly with component A compounds to viscose and to be spun therewith, under customary spinning conditions.

In those cases, however, in which the component B compounds are vinyl compounds containing halogen, phosphonitrogen or phosphorus of the formula:

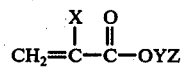

in which X stands for a hydrogen atom or a methyl group, Y stands for an alkylene group, Z stands for a phosphoric acid alkylester or a mixed phosphoric acid alkylesteramide group, and where the alkylene group Y and the alkyl groups of the phosphoric acid ester or mixed phosphoric acid ester-amide group may contain halogen, the invention provides for those component B compounds to be applied to, and to be chemically combined with, the spun fibres or flat textile structures made therefrom, by polymerization or graft-polymerization, if desired with the aid of a catalyst.

A further preferred embodiment of the present process provides for the component A compounds to be added to viscose and for the spun fibres or textile structures made therefrom to be impregnated with the component B compounds in the form of a solution of tetrakis-(oxymethyl)-phosphonium chloride or hydroxide or of tris-(1-aziridinyl)-phosphine oxide or of N-(oxymethyl)-3-phosphonopropionamide together with a condensation resin.

The flame retardant regenerated cellulose fibres made as described hereinabove offer the following beneficial effects.

They contain relatively minor proportions of flame-retardant agent, preferably less than 18% (based on the fibre material) in or on the fibre, whereby the fibres' textile properties are less impaired than by prior processes. As a result, the fibres are easier to make into yarn and fabrics or other textile materials, which accordingly have improved use properties. The fibres made by the process of the present invention have very good flame-retardant properties and therefore are very useful for making light weight textile materials. These have been made heretofore from fibres which contained high proportions of flame-retardant agents and which naturally affected the articles' general use properties. A further beneficial effect of the fibres made in accordance with the present invention, or of flat textile structures made therefrom, resides in the fact that they have a good stability to washing.

The following Examples illustrate the invention

EXAMPLE 1

15 weight % (based on cellulose) of triphosphorus pentanitride $P_3N_5$ in pigment form (component A) and 5 weight % (based on cellulose) of liquid poly-(iso-propoxy)-phosphazene - $[N=P((CH_3)_2CHO)_2—]_n$, where $n$ stands for a number between 3 and 9, (component B) were metered continuously into a viscose containing 6.5 weight % of cellulose, 6 weight % of alkali, 34 weight % of $CS_2$, based on cellulose, and 2 weight % of a modifying agent, based on cellulose. The viscose had a viscosity of 80 fbsec. and a spinning ripeness of 54 gamma units. By means of a homogenizer, the A and B components were very finely distributed in the viscose, which was spun at 40° C into a spinning bath containing 80 g/l of $H_2SO_4$, 120 g/l of $Na_2SO_4$, and 50 g/l of $ZnSO_4$. The spinning tow, which had a total titre approaching 200 000 dtex, was drawn at a rate equal to 100% of its initial length in a second and more dilute spinning bath at 90° C and thereafter cut up in a cutting machine to form staple fibres, which were subjected to the after-treatment customary in the spinning of viscose fibres.

The conditioned fibres had the following textile properties: Titre: 1.3 dtex; strength of fibre: 24.8 p/tex; elongation: 17%; loop strength: 8.1 p/tex.

To determine the flame-retardant effect, a fabric which had a superficial density of 150 g/m² was subjected to a vertical burning test (German Industrial Standard Test No. 53 906). The following results were obtained:

|  | Ignition time 3 sec. | Ignition time 15 sec. |
| --- | --- | --- |
| Burning time in sec. | 0 | 0 |
| Glow time in sec. | 0 | 0 |
| Tear length in cm | 2.9 | 8.1 |

The fabric was washed 50 times at 60° C in a domestic washing machine. The flame-retardant properties of the fabric so washed were tested once again, but could not be found to have been impaired.

EXAMPLE 2

14 weight % (based on cellulose) of phosphorus nitride oxide (PNO) in pigment form (component A) and 4 weight % (based on cellulose) of a condensation product (which was also used in pigment form) of tetrakis-(oxymethyl)-phosphonium chloride (component B) with ammonia were added to the viscose of Example 1. The other conditions were the same as those used in Example 1.

The conditioned fibres had the following textile characteristics: Titre: 1.7 dtex; strength of fibre: 25.2 p/tex; elongation: 16.5 %; loop strength: 8.5 p/tex.

To determine the flame-retardant effect, a fabric which had a superficial density of 170 g/m² was subjected to a vertical burning test (German Industrial Standard Test No. 53 906). The following results were obtained:

|  | Ignition time 3 sec. | Ignition time 15 sec. |
| --- | --- | --- |
| Burning time in sec. | 0 | 0 |
| Glow time in sec. | 0 | 0 |
| Tear length in cm | 2.6 | 7.8 |

The wash test described in Example 1 was repeated. The flame-retardant properties of the fabric could not be found to have been impaired.

EXAMPLE 3

12 weight % (based on cellulose) of triphosphorus pentanitride ($P_3N_5$) (component A) was added to a viscose the same as that used in Example 1, which was spun in the manner described therein. The second bath, however, was maintained at a lower temperature and contained less acid so that the spinning tow coming from the second bath presented a residual gamma value of more than 1. The tow was cut to staple fibres which were suspended so as to form a fibre fleece. The fleece was impregnated with an iron-II-sulfate catalyst, squeezed off and then impregnated with a hydrogen peroxide-containing aqueous emulsion of diethylphosphatoethylmethacrylate (component B), of which 4 weight % (based on cellulose) was applied to the fleece. Following this, the fleece was conveyed through a zone maintained at high temperatures and subjected to the after-treatment customary in the spinning of viscose fibres.

The conditioned graft-polymerized fibres had the following textile characteristics:
Titre: 1.8 dtex; strength of fibre: 25.8 p/tex;
elongation: 16.5%; loop strength: 7.9 p/tex.

To determine the flame-retardant effect, a fabric having a superficial density of 190 g/m² was subjected to German Industrial Standard Test No. 53 906. The following results were obtained:

|  | Ignition time 3 sec. | Ignition time 15 sec. |
| --- | --- | --- |
| Burning time in sec. | 0 | 0 |
| Glow time in sec. | 0 | 0 |
| Tear length in cm | 3.5 | 8.4 |

The fabric was washed in the manner described in Example 1. Its flame-retardant properties could not be found to have been impaired.

EXAMPLE 4

15 weight % (based on cellulose) of triphosphorus pentanitride $P_3N_5$ (component A) was added to a viscose the same as that used in Example 1, and the whole was treated under the conditions described therein. The resulting fibres were made into a fabric having a superficial density of 170 g/m². The fabric so made was impregnated on a two roll calender with a solution containing N-(oxymethyl)-3-(diethylphosphono)-propionamide (component B), a fixing agent and a catalyst. 4 weight % (based on cellulose) of component B was found to have been absorbed by the fabric. Following this, the fabric was dried for 60 seconds at 125° C, set for 60 seconds at 160° C, washed out and dried once again. To determine the flame-retardant effect, the fabric was subjected to German Industrial Standard Test No. 53 906. The following results were obtaned:

|  | Ignition time 3 sec. | Ignition time 15 sec. |
| --- | --- | --- |
| Burning time in sec. | 0 | 0 |
| Glow time in sec. | 0 | 0 |
| Tear length in cm | 2.5 | 6.8 |

We claim:

1. In the process for making flame-retardant regenerated cellulose fibers by adding flame-retardant phosphorus compounds to viscose, extruding the viscose-containing mixture so obtained into a spinning bath, stretching and after-treating the resulting filaments or staple fibers, the improvement comprising adding as the flame-retardant a combination of triphosphorus pentanitride (component A) with a compound selected from the group consisting of diethylphosphatoethylmethacrylate and N-(oxymethyl)-3-(diethylphosphono)-propionamide (component B), the amount of component A compound being 4–17 weight % and the amount of component B compound being 1–5 weight %, the percentages being based on the quantity of cellulose used.

2. The process as claimed in claim 1, wherein the component A compound is added to the viscose and diethylphosphatoethylmethacrylate is supplied to the spun fibres or flat textile structures made therefrom, by polymerization or graft polymerization.

3. The process as claimed in claim 1, wherein the component A compound is added to the viscose and the spun fibres or textile structures made therefrom are impregnated with a solution containing N-(oxymethyl)-3-(diethylphosphonopropionamide (component B), a fixing agent and a catalyst.

* * * * *